United States Patent Office 3,808,325
Patented Apr. 30, 1974

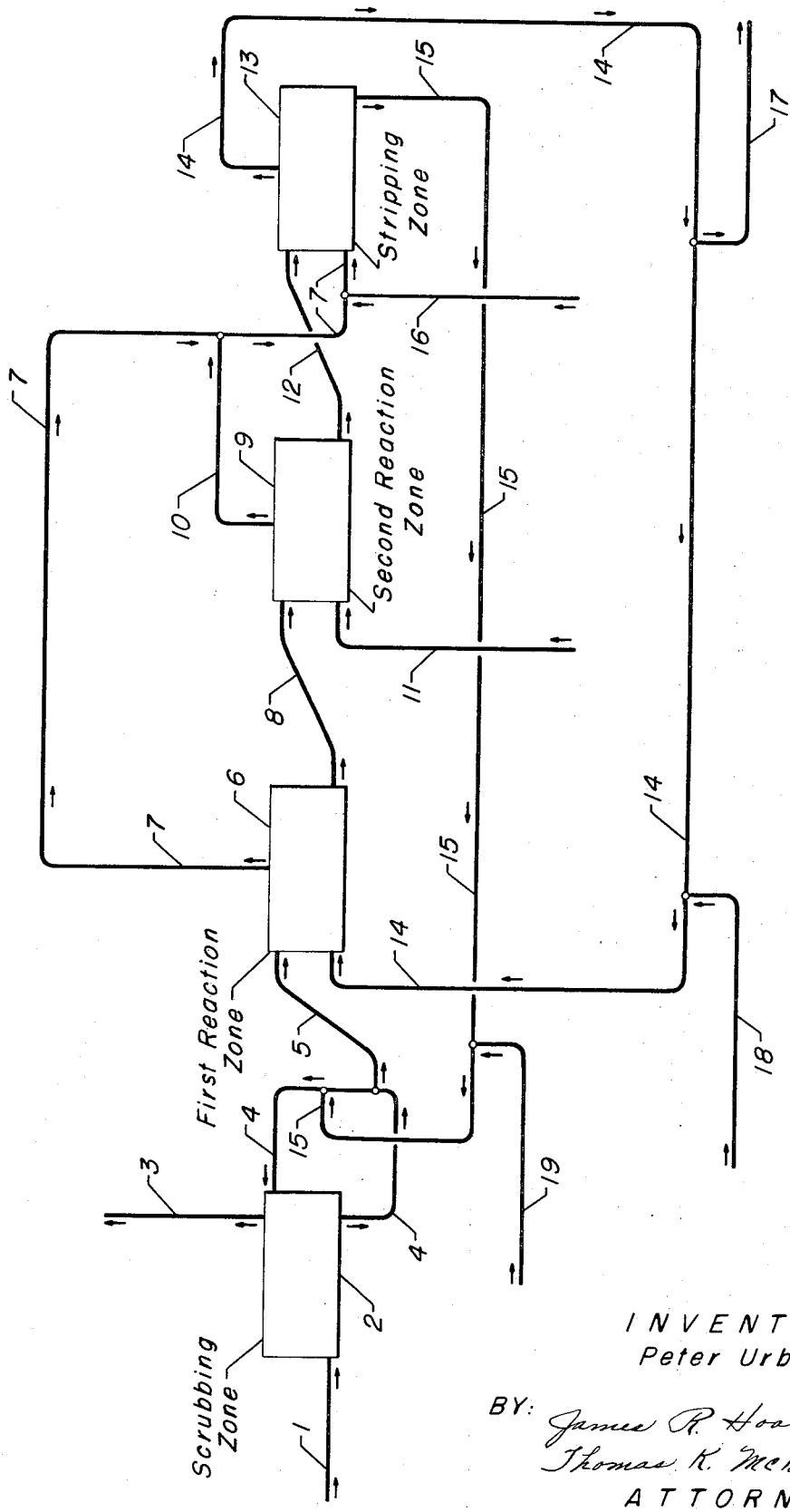

3,808,325
CONTINUOUS PROCESS FOR SCRUBBING $SO_2$ FROM A GAS STREAM WITH CO REGENERATION AND $CO_2$ STRIPPING
Peter Urban, Northbrook, Ill., assignor to Universal Oil Products Company, Des Plaines, Ill.
Continuation-in-part of application Ser. No. 128,428, Mar. 26, 1971, which is a continuation-in-part of application Ser. No. 9,894, Feb. 9, 1970, now Patent No. 3,574,097. This application Oct. 28, 1971, Ser. No. 193,511
Int. Cl. C01b 17/00
U.S. Cl. 423—242
18 Claims

ABSTRACT OF THE DISCLOSURE

An input gas stream containing $SO_2$ is continuously treated in order to remove a substantial portion of the $SO_2$ therefrom by the steps of: (a) scrubbing the input gas stream with an aqueous absorbent stream containing an alkaline reagent; (b) treating the resulting rich absorbent stream with a gaseous mixture of $H_2S$ and $CO_2$ at conditions selected to convert the sulfite compound contained therein to the corresponding thiosulfate compound and to produce a gas stream enriched in $CO_2$ content; (c) reacting the resulting thiosulfate compound with carbon monoxide at reduction conditions selected to produce a liquid stream containing the corresponding sulfide compound; (d) adding $CO_2$ to the gas stream from step (b) to make a stripping gas; (e) stripping hydrogen sulfide from the liquid stream produced in step (c) by countercurrently contacting the liquid stream with the resulting stripping gas to form a regenerated aqueous absorbent stream and an overhead gas stream containing $H_2S$ and $CO_2$; (f) passing at least a portion of the regenerated absorbent stream to the scrubbing step and passing at least a portion of the overhead gas stream formed in step (e) to step (b). The principal utility of this scrubbing process is associated with the problem of continuously removing a sulfur dioxide contaminant from flue or stack gas streams such as are typically produced in modern electrical power generating stations in order to abate a serious pollution problem and to enable the safe, nonpolluting burning of high sulfur fuels. Key features of this process are: selective conversion of the sulfite compound obtained from the scrubbing step to the corresponding thiosulfate compound in a preliminary treatment step using a portion of a subsequently produced $H_2S$ product stream, reduction of the resulting thiosulfate compound to the corresponding sulfide compound in a highly efficient economic and selective manner, stripping of $H_2S$ with a specially prepared $CO_2$ stream, minimization of undesired sulfate byproducts during all of these conversion steps and use of a relatively cheap, continuously regenerated absorbent which has a high capacity for $SO_2$ as well as a high efficiency for $SO_2$ removal.

CROSS REFERENCES TO RELATED APPLICATIONS

This application is a continuation-in-part of my prior copending application Ser. No. 128,428 which was filed Mar. 26, 1971 and which in turn is a continuation-in-part of my prior application Ser. No. 9,894 which was filed Feb. 9, 1970 and is now U.S. Pat. No. 3,574,097.

DISCLOSURE

The subject of the present invention is a novel, continuous process for the selective removal of $SO_2$ from a gas stream containing same. More precisely, the present invention involves an $SO_2$-scrubbing step operated with an aqueous absorbent containing an alkaline reagent coupled with a unique regeneration procedure which comprises: a preliminary treatment step wherein sulfite compound contained in the rich scrubbing solution are converted to the corresponding thiosulfate compound by a selective reaction with $H_2S$, a primary reduction step wherein the resulting thiosulfate compound is converted by reaction with carbon monoxide to the corresponding sulfide compound, and a stripping step wherein the absorbent solution is regenerated by reaction with $CO_2$ with liberation of hydrogen sulfide. In one important aspect, the present invention has to do with a scrubbing process which is operated with highly efficient aqueous absorbent comprising ammonium bicarbonate and/or carbonate wherein the rich scrubbing solution withdrawn from the scrubbing step contains ammonium sulfite and/or ammonium bisulfite. wherein the preliminary treatment step involves a selective reaction of the ammonium sulfite and/or ammonium bisulfite with a gas stream containing $H_2S$ and $CO_2$ to produce ammonium thiosulfate, wherein the primary reduction step involves selective reduction with carbon monoxide of the resulting ammonium thiosulfate to ammonium sulfide and/or hydrosulfide and wherein $H_2S$ is stripped from the resulting solution with $CO_2$, a portion of which comes from the preliminary treatment step, to form the regenerated absorbent and at least a portion of the $H_2S$ used in the thiosulfate formation reaction.

A major problem encountered in many areas of industry today is associated with the production of waste gas streams containing sulfur dioxide. The problem essentially involves the disposal of these waste gas streams without causing substantial air pollution. This problem is an extremely complex one because of the wide variety of industrial sources that emit these sulfur dioxide-containing gas streams. One of the more common sources is associated with the combustion of sulfur-containing fuels in boilers, internal combustion engines, heating units, etc., to produce flue or stack gas streams containing significant amounts of sulfur dioxide. Similarly, waste gas streams of this type are generally produced by other industrial processes such as the smelting of sulfur-beating ores, the refining of coke, the production of sulfur in a Claus process, the production of paper via a wood pulping process and the like industrial processes. It is well known that the indiscriminate discharge of these gas streams into the atmosphere results in an substantial air pollution problem because the sulfur dioxide has extremely detrimental effects on animal and plant life. In addition, the discharge of these gas streams into the atmosphere constitutes a waste of a valuable material because the sulfur contained in same is an industrial commodity. Many processes have been proposed for removal of sulfur dioxide from these gas streams. A large percentage of these proposed removal procedures involve contacting the sulfur dioxide containing gas stream with an aqueous absorbent stream which typically contain materials which chemically or physically react with the sulfur dioxide in order to absorb same into the liquid solution. A widely studied procedure involves the use of a solution of an alkaline reagent such as ammonium hydroxide or carbonate, one of the alkali or alkaline earth metal salts such as sodium hydroxide or carbonate, potassium hydroxide or carbonate and the like alkaline reagents, to produce a rich absorbent stream containing the corresponding sulfite and/or bisulfite compound. For example, the use of an aqueous absorbent containing sodium bicarbonate and carbonate to form a rich scrubbing solution containing sodium sulfite and bisulfite.

Although the simple concept of the scrubbing $SO_2$ from a gas stream containing same with an aqueous absorbent containing an alkaline reagent has many advantages associated with it such as simplicity, high effectiveness and versatility, wide spread adoption of this type of solution to the $SO_2$ pollution problem has been inhibited by the lack of a regeneration procedure for the rich absorbent stream which can continuously regenerate the rich absorbent stream by selectively and economically converting the absorbed $SO_2$ to a conveniently handled and saleable product in a highly selected manner. That is, it is required that the regeneration procedure enable the operation of the scrubbing system in a closed-loop manner with respect to the absorbent. In particular, it is required that an acceptable regeneration procedure have the capability of not only continuously producing a regenerated absorbent stream but also minimizing undesired byproducts so as to prevent the buildup of undesired intractable, difficultly removed ingredients in the absorbent stream once the system is operated in a closed-loop fashion. The byproduct that is of the greatest concern in this regard is sulfate—for example, in a system using an aqueous solution of ammonium hydroxide or ammonium carbonate as the absorbent, ammonium sulfate and bisulfate salts once formed in the system can present serious problems if special means are not provided to remove them or their production is not suppressed. Specifically, these salts can build up until finely divided solids are formed which then can cause corrosion, erosion and fouling problems.

One solution that has been proposed to the problem of regenerating the rich absorbent streams of the types discussed above is the use of the suitable reducing agent to react with the sulfite compounds contained therein in a one-step operation in order to selectively produce elemental sulfur and/or the corresponding sulfide compound. However, despite stringent precautions, when common reducing agents such as hydrogen, a suitable sulfide compound, or carbon monoxide are used in an attempt to directly reduce these sulfite compounds to elemental sulfur or the corresponding sulfide compounds, undesired sulfate compounds are formed in unacceptable amounts. These sulfate compounds are believed to be caused by the sulfite compounds undergoing autooxidation-reduction at the conditions necessary for direct reduction.

The problem addressed by the present invention is, therefore, to provide a flue gas scrubbing system which is capable of continuous operation with a closed-loop absorbent circuit, which can selectively produce an easily removed substance as the principal product of the regeneration section and which can minimize the amount of undesired sulfate byproducts formed in the regeneration section.

I have now found a combination process for continuously scrubbing $SO_2$ from a gas stream which utilizes a conventional aqueous absorbent stream in a close-loop fashion and which comprises a wet scrubbing step coupled with a novel regeneration procedure which enables the recovery of hydrogen sulfide in high yield, minimizes undesired sulfate byproducts from the regeneration section and produces a regenerated absorbent stream which is of a relatively low total sulfur content and, consequently, possesses a high capacity for $SO_2$ removal. The concept of the present invention is based on my finding that the sulfite compound contained in the rich scrubbing solution withdrawn from the $SO_2$-scrubbing step can be easily converted at relatively low severity conditions to the corresponding thiosulfate compound by a selective reaction with $H_2S$ without forming any substantial amounts of undesired, intractable sulfate compounds. Coupled with this finding are my additional observations that the thiosulfate compound can be catalytically reduced by carbon monoxide in a highly selective, economic and efficient manner to form the corresponding sulfide compound and that hydrogen sulfide can be easily stripped from the resulting solution with a $CO_2$-containing stripping gas which is, at least in part, specially prepared by a controlled reaction in a preliminary treatment step. Thus the central point of the present process involves using a conventional scrubbing procedure coupled with a regeneration procedure wherein thiosulfate is used as an intermediate in a multistep operation designed to convert the sulfite compound contained in the rich absorbent stream to hydrogen sulfide, rather than an attempt to directly reduce the sulfite compound to sulfide in a single step operation. This sulfite-to-thiosulfate-to-sulfide route provides a regeneration procedure which facilitates careful control of byproduct formation during the regeneration operation and enables the production of a regenerated absorbent stream which can be directly recycled to the scrubbing step, thereby allowing the system to be operated in the closed-loop fashion with respect to the absorbent stream.

It is accordingly, an object of the present invention to provide a simple, effective, efficient, and selective procedure for treating a gas stream containing $SO_2$ which process can selectively produce hydrogen sulfide and operate with a continuous closed-loop circuit of absorbent between the scrubbing section and the regeneration section. Another object is to minimize the amount of undesired, intractable byproducts formed in the regeneration section of such a procedure. Yet another object is to provide a regeneration procedure for an $SO_2$-scrubbing step that maximizes the sulfur differential across the regeneration procedure, thereby increasing the capacity and efficiency of the regenerated absorbent. Still another object is to provide a procedure for generating at least a part of the stripping gas needed for liberating $H_2S$ once it is produced.

In brief summary, one embodiment of the present invention is a process for treating an input gas stream containing $SO_2$ in order to continuously remove a substantial portion of the $SO_2$ therefrom. The first step is an $SO_2$-scrubbing step wherein the input gas stream is contacted in a suitable liquid-gas contacting zone with an aqueous absorbent stream containing an alkaline reagent at scrubbing condition selected to result in a treated gas stream containing a substantially reduced amount of $SO_2$ and in an effluent water stream containing a water-soluble sulfite compound. The next step is a preliminary treatment step which involves reacting at least a portion of the effluent stream from the scrubbing step with a gas stream containing $H_2S$ and $CO_2$ thiosulfate production conditions selected to form a liquid effluent stream containing a thiosulfate compound and a $CO_2$ rich gas stream. Thereafter, the liquid effluent stream from the preliminary treatment step is reacted with carbon monoxide in the primary reduction step at reduction conditions selected to produce a sulfide-containing liquid effluent stream. $CO_2$ is then admixed with the $CO_2$-containing gas stream formed in the preliminary treatment step in order to prepare a stripping gas stream. The next step is a stripping step wherein hydrogen sulfide is stripped from the liquid effluent stream from the primary reduction step by counter-currently contacting it with the stripping gas to produce an $H_2S$- and $CO_2$-containing overhead gas stream and a regenerated aqueous absorbent stream. In the final step, at least a portion of the resulting overhead gas stream is passed to the preliminary treatment step in order to supply $H_2S$ reactant therefore, and at least a portion of the resulting regenerated aqueous absorbent stream is passed to the $SO_2$-scrubbing step, thereby providing a closed-loop flow circuit of absorbent.

In another embodiment, the invention is a process as outlined above in the first embodiment wherein the alkaline reagent utilized in the aqueous absorbent stream is selected from the group consisting of the carbonate and bicarbonate salts of ammonia, the alkali metals and the alkaline earth metals which hydrolyze in water to form a basic solution—for example, ammonium carbonate, sodium carbonate and the like.

In a more specific embodiment, the present invention is a process for treating a gas stream containing $SO_2$ in order to remove a substantial portion of the $SO_2$ therefrom. The first step in this embodiment involves an $SO_2$-scrubbing step in which the input gas stream is contacted with an aqueous absorbent containing ammonium bicarbonate or carbonate at scrubbing conditions selected to form a treated gas stream containing a substantially reduced amount of $SO_2$ and an effluent water stream containing ammonium sulfite or bisulfite. At least portion of the effluent water stream from the scrubbing step is thereafter reacted, in a preliminary treatment step, with a gas stream containing $H_2S$ and $CO_2$ at thiosulfate production conditions selected to result in a liquid effluent stream containing ammonium thiosulfate and a $CO_2$-rich gas stream. The primary reduction step then involves reacting the liquid effluent stream from the preliminary treatment step with a carbon monoxide stream at reduction conditions selected to produce a liquid effluent stream containing ammonium sulfide or hydrosulfide. The $CO_2$-rich gas stream from the preliminary treatment step is then combined with additional $CO_2$ to make a stripping gas stream. The liquid effluent stream from this primary reduction step is thereafter subjected to countercurrent contact with the stripping gas at stripping conditions effective to produce a regenerated aqueous absorbent stream containing ammonium bicarbonate or carbonate and an overhead gaseous stream containing $H_2S$ and $CO_2$. The final step then involves passing at least a portion of overhead gaseous stream from the stripping step to the preliminary treatment step and passing at least a portion of the resulting regenerated absorbent stream to the scrubbing step, thereby providing a closed-loop flow circuit of absorbent.

Yet another embodiment of the present invention involves a process as outlined above in the first embodiment wherein the primary reduction step is performed in the presence of a catalyst comprising a catalytically effective amount of a metallic component selected from the group consisting of the transition elements of Groups VI and VIII of the Periodic Table, and compounds thereof, combined with a porous carrier material.

Other objects and embodiments of the present invention are hereinafter disclosed in the following detailed discussion of the input streams, the preferred conditions, the preferred reactants, the output streams and mechanics associated with each of the essential and preferred steps of the present invention.

The starting point for the subject process is a scrubbing step wherein an input gas stream containing $SO_2$ is contacted in a suitable gas-liquid contacting means with an aqueous absorbent stream containing an alkaline reagent. As previously explained, the input gas stream passed to this step is typically a flue or stack gas. For example, a typical stack gas stream containing about 1 to about 10% $O_2$, about 5 to 15% or more $CO_2$, about 3 to about 10% or more $H_2O$, about 0.01 to about 1% or more $SO_2$. In many cases, the input gas stream will also contain carbon monoxide, oxide of nitrogen, entrained fly ash and the other well known ingredients for flue gas streams. The amount of $SO_2$ contained in this input gas stream can vary over a wide range; namely from about 0.01 to about 1 mole percent or more, with a more typical amount being about 0.05 to about 0.05 mole percent. In many cases, this input gas stream is available at a relatively high temperature of about 200 to about 500° F. or more, and since it is preferred that the temperature of the input gas stream be at a relatively low level because this increases the capacity of the absorbent solution, it is often advantageous to cool the input gas stream by any suitable means such as by presaturating it with water under adiabatic conditions.

The aqueous absorbent stream utilized in this scrubbing step is generally characterized as an aqueous solution of a suitable water-soluble alkaline reagent which reacts with water to give a basic solution (i.e. one more basic than a solution of $SO_2$ in $H_2O$) such as ammonium hydroxide, ammonium carbonate and bicarbonate, the alkali metal hydroxides, the alkali metal carbonates and bicarbonates and the water-soluble alkaline earth metal hydroxide, carbonates and bicarbonates, and the like alkaline reagents. Of the alkali metal reagents, sodium hydroxide, sodium carbonate, sodium bicarbonate, potassium hydroxide, potassium carbonate, potassium bicarbonate are particularly preferred. In most cases, excellent results are obtained when the alkaline reagent is ammonium hydroxide or ammonium carbonate or ammonium bicarbonate. It is to be noted that it is within the purview of the present invention to use a mixture of the alkaline reagents previously mentioned. Since it is also contemplated that the scrubbing step can be operated with the absorbent continuously cycling around the scrubbing means, it is possible that absorbent could accumulate substantial amounts of sulfite and bisulfite compounds. In this last case, only a small portion of the rich effluent stream from the scrubbing step would be sent to the regeneration section of the process, and the major portion of the rich absorbent withdrawn from the scrubbing step would be commingled with the regenerated absorbent stream and recycled to the scrubbing step.

The amount of alkaline reagent contained in the scrubbing solution is subject to some choice depending upon the specific requirements associated with the particular gas stream being treated; ordinarily, acceptable results are obtained when the alkaline reagent comprises about 1 to about 50 wt. percent of the absorbent solution, and more preferably to 1 to about 15 wt. percent. Of course, absorbent solutions containing an amount of the alkaline reagent up to the solubility limit of the particular alkaline reagent selected at the conditions maintained in the scrubbing step can be utilized if desired. In the case where the absorbent is continuously cycled around the scrubbing step and only a drag stream drawn off for regeneration, the total amount of the alkaline reagent contained in the solution (i.e. fresh and spent) can reach rather high levels; for example, it can easily constitute 30 to 50 wt. percent of the absorbent solutions.

This $SO_2$-scrubbing step can be carried out in a conventional scrubbing zone in any suitable manner including multiple stages. The scrubbing solution can be passed into the scrubbing zone in either upward or downward flow and the input gas stream can be simultaneously introduced into the scrubbing zone in concurrent flow relative to the scrubbing solution. A particularly preferred procedure involves downward flow of the scrubbing solution with countercurrent flow of the gas stream which is to be treated. The scrubbing zone is preferably a conventional gas-liquid contacting zone containing suitable means for effecting intimate contact between a descending liquid stream and an ascending gas stream. Suitable contacting means include bubble trays, baffles, and any of the various packing materials known to those skilled in the art. In this countercurrent mode of operation, a treated gas stream is withdrawn from the upper region of the scrubbing zone and a rich absorbent solution is withdrawn from the lower region thereof. For the class of alkaline reagents of concern here, the rich absorbent solution will contain substantial amounts of a water-soluble sulfite compound such as ammonium sulfite and/or bisulfite, sodium sulfite and/or bisulfite and the like. As indicated previously, according to one mode of operation of the scrubbing step, only a drag stream from the rich absorbent withdrawn from the step is sent to the regeneration section of the process; the rest is cycled around the scrubbing step. The drag stream is ordinarily withdrawn at a rate at least sufficient to continuously remove the net sulfur taken up in the scrubbing step.

This $SO_2$-scrubbing step is generally conducted under conventional scrubbing conditions which are selected on the basis of the characteristics of the specific alkaline reagent utilized, the sulfur dioxide content of the input gas stream, the portion of the sulfur dioxide that is to be removed in the scrubbing step, and the physical properties of the scrubbing zone. Ordinarily, the scrubbing step is preferably operated at a relatively low temperature of about 10 to 100° C., a relatively low pressure which typically approximates atmospheric (although better results are obtained at higher pressures), a volume ratio of input gas streams to scrubbing solution of about 10:1 to about 10,000:1, preferably about 50:1 to about 1000:1, and a pH of about 4 to 7 or more. When the input gas stream is a flue or stack gas stream, means must ordinarily be provided for cooling the input gas stream to a relatively low temperature before it is introduced into the scrubbing step. Likewise, since the typical operation of the scrubbing step involves the handling of large volumes of gas containing only a relatively small amount of sulfur dioxide, it is preferred that the pressure drop through the scrubbing zone be held to a minimum so as to avoid the necessity of compressing large volumes of gas to overcome the pressure drop within the scrubbing zone.

Following the $SO_2$-scrubbing step, the next step of the present process is the preliminary treatment step and it involves the conversion, in the highly selective manner, of the sulfite or bisulfite compound contained in at least a portion of the effluent water stream withdrawn from the scrubbing step, to the corresponding thiosulfate compound. Ordinarily the sulfite or bisulfite compound is contained in the feed stream to this step in an amount of about 0.01 wt. percent, calculated on an equivalent basis, up to the solubility limit of the particular sulfite compound in water at the conditions utilized in the scrubbing step; for example, the feed stream to this step can contain about 1 to about 20 wt. percent or more sulfur as ammonium sulfite and/or bisulfite. According to the present invention, this step involves a reaction between the sulfite compound contained in this rich absorbent stream and a gas stream containing $H_2S$ and $CO_2$. Moreover, it is a feature of the present process that, after start-up of the process, this gas stream containing $H_2S$ and $CO_2$ is obtained from a subsequently described stripping step. The active ingredient in this gas stream is $H_2S$ and it acts as a reducing agent with respect to the sulfite contained in the absorbent stream. The amount of this sulfide reactant utilized in this step is at least sufficient to provide 0.5 mole of sulfide compound per mole of sulfite compound contained in the rich absorbent stream, with best results obtained at a mole ratio corresponding to about 0.6:1 to about 1.5:1 or more. Likewise, good results are ordinarily obtained when the pH of the effluent water stream is in the range of 4 to about 7.

Conditions utilized in this preliminary treatment step can be generally described as thiosulfate production conditions and comprise: a temperature of about 20 to about 150° C. and preferably about 25 to about 100° C., a pressure sufficient to maintain the effluent water stream in the liquid phase such as about 10 to about 150 p.s.i.g. and a contact time corresponding to about 0.05 to 1 or more hours. For example, excellent results have been obtained at a temperature of 65° C., a pressure of 50 p.s.i.g., a contact time of 5 minutes, sulfide to sulfite mole ratio of 1.1:1, and a pH of about 4 to about 7.

Following this preliminary treatment step, a liquid effluent stream containing relatively large amounts of a thiosulfate compound is withdrawn therefrom and passed to the primary reduction step of the present process wherein it is reacted with carbon monoxide at reduction conditions selected to produce the corresponding sulfide compound. Also withdrawn from this preliminary treatment step is a gas stream containing $CO_2$. This gas stream is relatively rich in $CO_2$ because substantially all of the $H_2S$ originally contained therein is reacted out in this preliminary treatment step—for example, a typical input gas stream to this step would contain 92% $CO_2$ and 8% $H_2S$, with the exit gas containing greater than 99% $CO_2$.

The carbon monoxide stream for use in the primary reduction step may be obtained from any suitable source or may be prepared in any suitable manner. An acceptable carbon monoxide stream is obtained by the partial oxidation of organic materials, and particularly carbon at high temperature with oxygen, air or steam. Likewise, a carbon monoxide stream suitable for use herein can be prepared by the reduction of carbon dioxide by hydrogen, carbon or certain metals at high temperatures. For example, a gas stream containing about 40% carbon monoxide is easily prepared by blowing steam through a bed of coal at an elevated temperature. Another suitable carbon monoxide-containing stream is obtained by simultaneously blowing air and steam through a bed of red hot coal to produce a gas stream containing about 30% carbon monoxide. In addition, blast furnace gases resulting from the reduction of iron oxide by red hot coke can be utilized to supply the necessary carbon monoxide stream if desired. Yet another source of a suitable carbon monoxide stream is a stream prepared by passing carbon dioxide and oxygen through charcoal or coke at a temperature greater than about 1,000° C. in order to decompose the $Co_2$ to CO. Regardless of the source of the carbon monoxide, it is preferably used herein in an amount sufficient to provide a mole ratio of carbon monoxide to thiosulfate compound of at least 4:1, with best results obtained at a mole ratio of about 5:1 to 10:1 or more. I have observed that the amount of sulfide formed increases with higher mole ratios of carbon monoxide to thiosulfate.

This primary reduction step can be carried out, if desired, without the use of a catalyst; however, in many cases, it is advantageous to use a catalyst for this reaction. Based on my investigations I have determined that improved results are obtained in this step when the reaction zone contains material such as particles of charcoal, and particles of activated carbon. Particularly good results are obtained with a catalyst comprising a metallic component selected from the group consisting of the transition metals of Groups VI and VIII, such as chromium, molybdenum, tungsten, iron, cobalt, nickel, platinum, palladium, etc. and compounds thereof. From this, I have concluded that preferred catalysts for the desired reduction reaction comprise a combination of a Group VI or a Group VIII transition metal component and particularly the metals and compounds of the iron group of Group VIII, with a suitable porous support such as alumina or activated carbon. Particularly preferred embodiments of the present step involve the use of catalysts in which the metallic component is present in the form of a metallic sulfide such as cobalt sulfide, or molybdenum sulfide, or tungsten sulfide combined with a carrier material. The preferred carrier materials are activated carbons such as those commercially available under the trade names of Norite, Nuchar, Darco and other similar products. In addition, other conventional natural or synthetic highly porous inorganic carrier materials may be used as the support for the metallic component such as alumina, silica, silica-alumina, etc. Best results are ordinarily obtained with a catalyst comprising cobalt or molybdenum or tungsten sulfide combined with relatively small particles of activated carbon. Excellent results have been obtained with 10 to 12 mesh activated carbon particles containing about 5 wt. percent of cobalt sulfide. In general, the amount of the metallic component utilized in the catalyst should be sufficient to comprise about 0.1 to about 50% thereof, calculated on a metallic sulfide basis. These catalysts can be prepared according to any of the conventional procedures for combining a metallic component with a carrier material, with an impregnation procedure with a soluble, decomposable compound of the desired Group VI or VIII transition metal ordinarily giving best results.

This primary reduction step can be carried out in a conventional reaction zone in any suitable manner. The thiosulfate-containing liquid effluent stream from the preliminary treatment step can be passed into the reaction zone in either upward, radial or downward flow and the carbon monoxide stream can be simultaneously introduced into the reaction zone in either countercurrent or concurrent flow relative to the thiosulfate-containing effluent stream. In particular, a preferred embodiment of this step involves downward flow of the thiosulfate stream with countercurrent flow of the carbon monoxide stream. It is preferred to utilize suitable means in the reaction zone for effecting intimate contact between a liquid stream and a gas stream. Suitable contacting means include bubble trays, baffles and any of the various packing materials known to those skilled in the art. In the preferred case where a catalyst is utilized in this second step, best results are ordinarily obtained when the catalyst is maintained within the reaction zone as a fixed bed of relatively small particles. These catalyst particles perform the dual functions of catalyzing the desired reaction and of promoting intimate contact between the gas and liquid streams. In the preferred countercurrent flow mode of operation for this step, a gas stream containing carbon dioxide, unreacted carbon monoxide and some hydrogen sulfide is typically withdrawn from the upper region of the reaction zone. Likewise, an aqueous effluent stream containing the corresponding sulfide compound is withdrawn from the lower region of the reaction zone. For example, in the case where the input stream to this primary reduction step contains ammonium thiosulfate, this aqueous effluent stream will primarily contain ammonium hydrosulfide with minor amounts of unreacted ammonium thiosulfate, ammonium carbonate and ammonium hydroxide.

The reduction conditions utilized in this primary reduction step are typically relatively more severe than those utilized in the preliminary treatment step and can be generally characterized as reduction conditions sufficient to effect conversion of thiosulfate to sulfide. The temperature is preferably selected from the range of about 100 to about 350° C., with best results obtained at a relatively high temperature of about 150 to about 250° C. It is an essential feature of the present invention that the step is conducted under liquid phase conditions; accordingly, the pressure employed must be sufficient to maintain at least a portion of the liquid effluent stream from the first step in the liquid phase. Typically the pressure is selected from the range of about 100 to about 3000 p.s.i.g., as a function of the reaction temperature in order to maintain the desired liquid phase condition. Particularly good results are obtained at a temperature of about 200° C., and a pressure of about 500 p.s.i.g. It is preferred to use a liquid hourly space velocity (defined on the basis of the liquid volume charge rate per hour of the effluent stream from the first step divided by the volume of the reaction zone utilized in this second step in the case where a catalyst is not utilized and by the volume of the catalyst bed in the case where a catalyst is used in this second step) selected from the range of about 0.25 to about 10 hr.$^{-1}$, with best results obtained at about 0.5 to about 3 hr.$^{-1}$. Excellent results have been obtained in this step with an LHSV of 1 hr.$^{-1}$.

In the next step of the present invention the liquid effluent stream recovered from the primary reduction step is subjected to a stripping step designed to liberate hydrogen sulfide therefrom. Although any suitable stripping gas can be utilized including steam, nitrogen, air and the like, carbon dioxide is particularly preferred because it acts to decrease the pH of the solution and form the corresponding carbonate salt. For instance, in the case where the effluent stream from the primary reduction step contains ammonium hydrosulfide, stripping with carbon dioxide liberates hydrogen sulfide and produces a regenerated absorbent stream containing ammonium bicarbonate and ammonium carbonate. According to the present invention, at least a portion of the $CO_2$ necessary for this stripping step is derived from the effluent gas stream recovered from the preliminary treatment step. I have observed that this gas stream provides a superior component of the stripping gas used in this stripping step because the reaction between sulfite and sulfide occurring in the preliminary treatment step acts to enrich the $CO_2$ content of the exit gas stream from this treatment step. It is, accordingly, a feature of the present invention that the required stripping gas is prepared by admixing carbon dioxide with the $CO_2$-rich gas stream produced in the preliminary treatment step. The amount of outside $CO_2$ that is added to this mixture is dependent on the amount of $CO_2$ contained in the $CO_2$-rich gas stream recovered from the preliminary treatment step and the amount of sulfide contained in the liquid effluent from the primary reduction step. In general, the amount of $CO_2$ added should be sufficient to insure that the mole ratio of $CO_2$ to sulfide charged to the stripping step is maintained substantially above 0.5:1, and preferably in the range of 0.5:1 to 2:1 or more.

This $H_2S$-stripping step is accomplished by countercurrently contacting the liquid effluent stream from the primary reduction step with the stripping gas stream at suitable $H_2S$-stripping conditions. In general, superior results are obtained when this step is performed at a relatively high temperature and at a relatively low pressure, preferably when the solution is boiling or just starting to boil. For example, excellent results are obtained in this step at a temperature of 125° C., a pressure of 17 p.s.i.g. and a mole ratio of $CO_2$ to feed sulfide of 1.1:1 with a feed stream containing 2.7 mole percent NaSH, 2.1 mole percent $NaHCO_3$ and 95.2 mole percent $H_2O$; specifically, these conditions resulted in 80% of the feed sulfide being taken overhead. This step is operated to produce an overhead gas stream containing $H_2S$ and $CO_2$—with $H_2O$ vapor in many cases—and a bottom stream comprising the regenerated aqueous absorbent.

This regenerated aqueous absorbent stream is substantially reduced in total sulfur content relative to the input rich absorbent stream and usually will contain less than 10% of the amount of sulfur contained in the input absorbent stream. Because carbon dioxide is utilized in the stripping step as the stripping medium, this regenerated absorbent stream will contain substantial amounts of the carbonate and/or bicarbonate salt of the alkaline reagent originally present in the input absorbent stream—for example in the case where the alkaline reagent is ammonia, the regenerated absorbent stream will contain ammonium carbonate and/or bicarbonate, and in the case where the alkaline reagent is sodium hydroxide or carbonate the treated water stream will contain sodium carbonate and/or bicarbonate.

In accordance with the instant process, at least a portion of the regenerated absorbent stream is passed or recycled to the $SO_2$-scrubbing step. Similarly a portion of the $H_2S$- and $CO_2$-containing overhead gas stream produced in the stripping step is passed to the preliminary treatment step in order to supply at least a portion of the $H_2S$ reactant used therein. The remaining portion of this hydrogen sulfide-containing stream is then recovered as one of the product streams from the instant process. The hydrogen sulfide contained in this product stream can be converted to elemental sulfur by any suitable oxidation procedure such as a conventional Claus process or to sulfuric acid or used per se.

Having broadly characterized the essential steps comprising the present process, reference is now made to the attached drawing for a detailed explanation of a working example of a preferred flow scheme for the present invention. The attached drawing is merely intended as a general representation of the flow scheme involved with no intention to give details about heaters, pumps, valves, and the like equipment except where a knowledge of these devices is essential to an understanding of the present invention or would not be self-evident to those skilled in the relevant art.

Referring now to the attached drawing, a flue gas stream enters the system via line 1 and is passed into the lower region of a conventional liquid-gas scrubbing means, zone 2. In this zone it is passed in countercurrent flow to a descending stream of absorbent solution which enters the upper region of zone 2 via line 4. The input gas stream contains about 5% $O_2$, 12% $CO_2$, 6% $H_2O$, 76.8% $N_2$ and 0.2% $SO_2$. Zone 2 is a conventional-gas liquid contacting zone fitted with conventional means such as baffles, trays, packing material and the like, for effecting intimate contact between an ascending gas stream and a descending liquid stream. The resulting treated gas stream is withdrawn from zone 2 via line 3.

Also introduced into zone 2 is a liquid stream comprising the aqueous absorbent solution. It enters zone 2 via line 4 and is made up of two separate streams, one of which is a regenerated absorbent stream obtained from the regeneration section of the present system and the second of which is a major portion of the rich absorbent stream withdrawn from the lower region of zone 2 via line 4. The alkaline reagent utilized in this absorbent stream is primarily ammonium carbonate with a minor amount of ammonium bicarbonate.

According to the mode of operation of zone 2 shown in the drawing, the rich absorbent stream is withdrawn from the bottom of zone 2 via line 4 and a major portion of this stream is continuously cycled around zone 2 in order to allow the concentration of sulfite salts in the absorbent stream to build to relatively high levels. This procedure increases the capacity of the absorbent and minimizes the amount of the absorbent stream that must be cycled through the regeneration section of the system. The absorbent stream introduced into scrubber 2 via line 4 will, accordingly, contain a substantial amount of sulfite salts along with the alkaline reagent. Ordinarily, zone 2 is operated by monitoring the pH of the absorbent stream at the inlet to zone 2 and controlling the amount of the rich absorbent stream diverted to the regeneration section of the system at the junction of line 4 and 5 in response to a decrease in pH level. The preferred pH range is about 4 to about 7 or more, with best results ordinarily obtained in the range of about 5 to 7. With the system operating so that the absorbent stream introduced into zone 2 via line 4 is maintained at a pH level within this range, the rich absorbent stream withdrawn continuously from zone 2 via line 4 can typically contain about 1 to about 15 or more wt. percent sulfur principally as a mixture of ammonium sulfite and ammonium bisulfite. In addition, minor amounts of ammonium sulfate and thiosulfate are formed in zone 2. In the particular case shown in the drawing, the rich absorbent preferably contains about 8 wt. percent sulfur as ammonium sulfite and bisulfite.

Zone 2 is operated at a temperature of about 50° C., a pressure of about atmospheric and a gas to absorbent volume ratio of about 200:1. At these conditions, the treated gas stream withdrawn from the upper region of zone 2 via line 3 is found to contain less than 5% of the $SO_2$ originally present in the input gas stream.

The rich absorbent stream withdrawn from the lower region of zone 2 via line 4 is divided into two portions at the junction of line 5 with line 4. The major portion continues on via line 4 and is admixed with regenerated absorbent at the junction of line 15 with line 4. The resulting mixture of cycled and regenerated absorbent is then reintroduced into zone 2 via line 4. The minor portion of the rich absorbent is passed via line 5 into the first reacting zone, zone 6. The amount of rich absorbent passed into zone 6 is ordinarily at least sufficient to remove the net sulfur input into zone 2 from the input gas stream in order to line out the concentration of sulfur in the absorbent stream. In the case under consideration, the amount of the absorbent withdrawn for regeneration via line 5 will be about 0.1 to 10% of the rich absorbent stream withdrawn from the bottom of zone 2. It is to be noted that during start-up of scrubbing zone 2, the inventory of the scrubbing solution needed for initiating operation is introduced into the system via lines 19, 15 and 4.

The rich absorbent stream introduced into zone 6 via line 5 in the particular case of concern here contains about 8 wt. percent sulfur as a mixture of ammonium sulfite and ammonium bisulfite. It is heated to a temperature of about 65° C. by heating means (not illustrated) prior to passage into zone 6. Zone 6 is a conventional liquid-gas contacting zone designed to effect intimate contact between a descending liquid stream which enters the upper region of zone 6 and flows downwardly to an exit port located in the bottom region of the zone. Also introduced into the lower region of zone 6 is a gas stream containing a mixture of $H_2S$ and $CO_2$. This gas stream flows upwardly through the descending liquid stream to an exit port in the upper region of the zone whereat it is withdrawn from the zone via line 7. During start-up of this zone sufficient $H_2S$ is introduced via lines 18 and 14 to initiate the desired reaction; thereafter, a portion of an $H_2S$- and $CO_2$-containing overhead gas stream, which is produced in a subsequently described stripping step, is passed to zone 6 from zone 13 via line 14. Regardless of the source of the reducing agent charged to zone 6, it is passed thereto in an amount at least sufficient to react about 0.5 mole of $H_2S$ per mole of sulfite charged to zone 6. It is to be noted that amounts of $H_2S$ in excess of this minimum amount can be beneficially utilized because excess $H_2S$ is absorbed into the liquid stream being treated and this absorbed $H_2S$ will materially aid the reaction occuring in subsequently described zone 9.

Zone 6 is maintained at thiosulfate production conditions which in this particular case are a temperature of about 65° C., a pressure of about 200 p.s.i.g. and a residence time of the liquid stream in zone 6 of about 0.1 hr.

An overhead gas stream containing relatively large amounts of $CO_2$ and very minor amounts of $H_2S$ is then withdrawn from zone 6 via line 7 and passed to the junction of line 10 with line 7 whereat it is admixed with additional $CO_2$ which is a byproduct of the reduction reaction occurring in second reaction zone 9. If additional $CO_2$ is necessary, it is added at the junction of line 16 with line 7. The resulting gas mixture then passes to the lower region of zone 13 via line 7.

A liquid effluent stream is withdrawn from the bottom of zone 6 via line 8, heated to a temperature of about 200° C. by heating means (not shown) and charged to the second reaction zone, zone 9. This aqueous effluent stream contains ammonium thiosulfate in an amount corresponding to a conversion in zone 6 of greater than 95% of the entering ammonium sulfite and bisulfite to ammonium thiosulfate. Furthermore, the amount of undesirable ammonium sulfate formed by the selective reaction occurring within zone 6 is less than 3% of the input sulfite. Thus, the liquid effluent stream withdrawn from zone 6 principally contains ammonium thiosulfate with minor amounts of unreacted ammonium sulfite and bisulfite and with trace amounts of ammonium sulfate. Because carbon dioxide is contained in the gas introduced into zone 6, this liquid effluent stream will also contain minor amounts of ammonium carbonate and bicarbonate.

The second reaction zone, zone 9, is another liquid-gas reaction zone designed to affect intimate contact between an ascending gas stream and a descending liquid stream. The liquid effluent stream from zone 6 is introduced into the upper region of the zone 9 via line 8. Introduced into the lower region of the zone 9 is a carbon monoxide-rich gas stream which enters the zone by means of lines 11. Zone 9 contains a catalyst comprising 10 to 20 mesh particles of Darco activated carbon having a cobalt sulfide component combined therewith in an amount sufficient to result in the catalyst containing 5 wt. percent cobalt. The catalyst is prepared by a conventional impregnation procedure with a water-soluble compound of cobalt followed by a sulfiding treatment at a relatively low temperature. The amount of carbon monoxide introduced into zone 9 corresponds to a carbon monoxide to ammonium thiosulfate mole ratio of 5.5:1. The reduction conditions maintained in zone 9 in this particular case are a temperature of 200° C., a pressure of 500 p.s.i.g. and liquid hourly space velocity of 1 $hr.^{-1}$.

A liquid effluent stream is then withdrawn from the lower region of zone 9 via line 12, cooled to a temperature of about 125° C. by cooling means (not illustrated) and passed to the upper region of stripping zone 13. This liquid stream contains ammonium hydrosulfide, trace amounts of unreacted ammonium thiosulfate, ammonium hydroxide, ammonium bicarbonate and a minor amount of ammonium sulfate. An analysis of this liquid stream indicates that 99% of the ammonium thiosulfate charged to zone 9 is converted therein, with 89% of this thiosulfate being converted to ammonium hydrosulfide. In addition, the analysis shows that less than 5% of the ammonium thiosulfate is converted in zone 9 to the undesired, refractory ammonium sulfate.

An overhead gaseous stream is similarly withdrawn from the upper region of zone 9 via line 10. An analysis of this stream indicates that it contains a relatively large amount of carbon dioxide with relatively minor amounts of unreacted carbon monoxide, hydrogen sulfide, ammonia and water vapor. As previously explained at the junction of line 10 with line 7, this overhead gaseous stream is combined with the $CO_2$-rich gas stream recovered from zone 6 via line 7 and the resulting mixture passed to the lower region of stripping zone 13 via line 7. Additional $CO_2$, if needed to meet the subsequently stated desired mole ratio of $CO_2$ to sulfide for zone 13, is added to the gas stream in line 7 via line 16.

In stripping zone 13, the liquid effluent stream charged thereto is countercurrently contacted with an ascending stripping gas which is introduced in the lower region of zone 13 by means of the line 7. The stripping gas is prepared by mixing $CO_2$, obtained from lines 10 and/or 16, with the overhead gas stream from zone 6 in an amount sufficient to result in a mole ratio of $CO_2$ to sulfide charged to zone 13 of 1:1. Zone 13 is operated in the conventional manner at a relatively high temperature of about 125° C. and a pressure of about 20 p.s.i.g. Zone 13 also typically contains suitable means for effecting intimate contact between a descending liquid stream and an ascending gas stream. Carbon dioxide is especially preferred for use as a stripping gas because it acts as to lower the pH of the liquid stream to the point where $H_2S$ is released from the solution and ammonium carbonate or bicarbonate is formed; it also helps to eliminate problems of $NH_3$ carry-over in the stripping gas stream. In some cases it is a preferred practice to inject into the top of zone 13, a portion of the bottom water stream withdrawn therefrom via line 15 in order to minimize $NH_3$ carry-over in the overhead gas stream.

An overhead gaseous stream is then withdrawn from zone 13 via line 14 and passed to the junction of line 14 with line 17. The major portion of this overhead stream is then withdrawn from the system via line 17. The gas stream withdrawn via line 17 contains the net sulfide product of the present process and, it can be charged to any suitable process for the recovery of sulfur or the manufacture of sulfuric acid; for example, this stream could be passed to a conventional Claus unit for recovery of sulfur via an oxidation procedure. This overhead gaseous streams contains relatively large amounts of hydrogen sulfide and carbon dioxide and minor amounts of ammonia and water. Another portion of this overhead stream is passed via line 14 to zone 6 in order to supply the hydrogen sulfide reactant necessary for the conversion of the sulfite to the thiosulfate in zone 6 and to enable the preparation of the stripping gas as explained hereinbefore.

A stream of regenerated absorbent is withdrawn from the lower region of zone 13 via line 15 and passed back to zone 2 via lines 15 and 4. This regenerated absorbent stream primarily contains a mixture of ammonium carbonate and bicarbonate with minor amounts of unreacted ammonium thiosulfate, unreacted ammonium sulfite, ammonium hydrosulfide and ammonium sulfate. The total sulfur content of this regenerated absorbent stream is less than 10% of the total sulfur content of the rich absorbent stream withdrawn from the scrubbing section of the system via line 5. Moreover, the amount of undesired ammonium sulfate formed in the regeneration section of the system (i.e., the section of the system comprising zones 6, 9 and 13) is less than 3% of the sulfite charged to the regeneration section via line 5. Thus the scrubbing process of the present invention enables the continuous scrubbing of $SO_2$ from the gas stream entering the system via line 1 with continuous regeneration and recirculation of absorbent in a closed-loop manner. In addition, the amount of undesired ammonium sulfate formed in the regeneration section of the system is held to extremely low levels.

It is intended to cover by the following claims all changes and modifications of the above disclosure of the present invention that would be self-evident to a man of ordinary skill in the gas treating art.

I claim as my invention:

1. A process for treating an input gas stream containing $SO_2$ in order to continuously remove $SO_2$ therefrom, said process comprising the steps of:
   (a) contacting the input gas stream with an aqueous absorbent stream containing an alkaline reagent selected from the group consisting of ammonium, alkali metal and alkaline earth metal hydroxides, carbonates and bicarbonates at scrubbing conditions selected to result in a treated gas stream containing a reduced amount of $SO_2$ and in an effluent water stream containing a water-soluble sulfite compound;
   (b) reacting at least a portion of the effluent stream from step (a) with a gas stream containing $H_2S$ and $CO_2$ at thiosulfate production conditions selected to form a liquid effluent stream containing a thiosulfate compound and a $CO_2$-rich gas stream;
   (c) reacting the liquid effluent stream from step (b) with carbon monoxide at reduction conditions selected to produce a liquid effluent stream containing a sulfide compound;
   (d) adding $CO_2$ to the $CO_2$-rich gas stream formed in step (b) to make a stripping gas;
   (e) stripping hydrogen sulfide from the liquid effluent stream produced in step (c) by countercurrently contacting the effluent stream with the stripping gas from step (d) to form an $H_2S$- and $CO_2$-containing overhead gas stream and a regenerated aqueous absorbent stream; and thereafter
   (f) passing at least a portion of the resulting regenerated aqueous absorbent stream to step (a) and passing at least a portion of the overhead gas stream formed in step (e) to step (b).

2. A process as defined in claim 1 wherein the alkaline reagent is ammonium carbonate or ammonium bicarbonate.

3. A process as defined as in claim 1 wherein the alkaline reagent is an alkali metal carbonate or alkali metal bicarbonate.

4. A process as defined as in claim 3 wherein the alkali metal is sodium.

5. A process as defined as in claim 3 wherein the alkali metal is potassium.

6. A process as defined in claim 1 wherein the alkaline reagent is a water-soluble alkaline earth metal carbonate or an alkaline earth metal bicarbonate.

7. A process as defined in claim 1 wherein the amount of carbon monoxide charged to step (c) is sufficient to provide a mole ratio of carbon monoxide to thiosulfate passed thereto of at least 4:1.

8. A process as defined as in claim 1 wherein the amount of $H_2S$ charged to step (b) is at least sufficient to provide a mole ratio of sulfide to sulfite in this step of 1:2.

9. A process as defined in claim 1 wherein step (c) is performed in the presence of activated carbon.

10. A process as defined as in claim 1 wherein step (c) is performed in the presence of a combination of a catalytically effective amount of a metallic component, selected from the group consisting of the transition metals of Groups VI and VIII of the Periodic Table and compounds thereof with a porous carrier material.

11. A process as defined in claim 10 wherein said metallic component of the catalyst is selected from the metal and compounds of the iron group metals.

12. A process as defined in claim 11 wherein the iron group metallic component is cobalt.

13. A process as defined in claim 10 employing as catalyst in step (c) a catalytically effective amount of cobalt sulfide combined with an activated carbon or an alumina carrier material.

14. The process of claim 1 further characterized in that step (a) is effected at a temperature of from about 10° to about 100° C., step (b) at a temperature of from about 20° to about 150° C. and step (c) at a temperature of from about 100° to about 350° C., steps (b) and (c) being under sufficient pressure to maintain the effluent streams treated therein in liquid phase.

15. The process of claim 14 further characterized in that step (a) is effected at a temperature of from about 10° to about 100° C., step (b) at a temperature of from about 20° to about 150° C. and step (c) at a temperature of from about 100° to about 350° C., steps (b) and (c) being under sufficient pressure to maintain the effluent streams therein in liquid phase.

16. A process for treating an input gas stream containing $SO_2$ in order to continuously remove a substantial portion of the $SO_2$ therefrom, said process comprising the steps of:
(a) contacting the input gas stream with an aqueous absorbent stream containing ammonium bicarbonate or carbonate at scrubbing conditions selected to form a treated gas stream containing a reduced amount of $SO_2$ and an effluent water stream containing ammonium sulfite or ammonium bisulfite;
(b) reacting at least a portion of the effluent water stream from step (a) with a gas stream containing $H_2S$ and $CO_2$ at thiosulfate production conditions selected to result in a liquid effluent stream containing ammonium thiosulfate and a $CO_2$-rich gas stream;
(c) reacting the liquid effluent stream from step (b) with carbon monoxide at reduction conditions selected to form a liquid effluent stream containing ammonium sulfide or hydrosulfide;
(d) adding $CO_2$ to the $CO_2$-rich gas stream formed in step (b) to make a stripping gas;
(e) countercurrently contacting the liquid effluent stream from step (c) with the stripping gas from step (d) to form an $H_2S$- and $CO_2$-containing overhead gas stream and a regenerated aqueous absorbent stream containing ammonium bicarbonate or carbonate; and thereafter,
(f) passing at least a portion of the resulting regenerated absorbent stream to step (a) and passing at least a portion of the $H_2S$- and $CO_2$-containing gas stream formed in step (e) to step (b).

17. A process as defined in claim 16 wherein carbon monoxide is charged to step (c) in an amount corresponding to a mole ratio of carbon monoxide to ammonium thiosulfate passed thereto of about 5:1 to about 10:1.

18. A process as defined in claim 16 wherein step (c) is performed in the presence of a combination of a catalytically effective amount of cobalt sulfide with a porous carrier material.

References Cited
UNITED STATES PATENTS

| | | | |
|---|---|---|---|
| 3,574,097 | 4/1961 | Urban | 210—61 |
| 3,644,087 | 2/1972 | Urban | 423—242 |
| 3,431,070 | 3/1969 | Keller | 423—242 X |
| 3,574,530 | 4/1971 | Suriani et al. | 423—242 |
| 3,627,470 | 12/1971 | Hamblin | 210—63 XL |

OSCAR R. VERTIZ, Primary Examiner

G. A. HELLER, Assistant Examiner

U.S. Cl. X.R.

210—59